United States Patent
Hausmann et al.

(10) Patent No.: US 8,303,822 B2
(45) Date of Patent: Nov. 6, 2012

(54) HIGHLY POROUS MAGNETIC TEMPORARY FIXED BED

(75) Inventors: Rudolf Hausmann, Karlsruhe (DE); Matthias Franzreb, Karlsruhe (DE)

(73) Assignees: Universität Karlsruhe, Karlsruhe (DE); Forschungszentrum Karlsruhe GmbH, Karlsruhe (DE)

( * ) Notice: Subject to any disclaimer, the term of this patent is extended or adjusted under 35 U.S.C. 154(b) by 627 days.

(21) Appl. No.: 12/306,345

(22) PCT Filed: Jul. 4, 2007

(86) PCT No.: PCT/EP2007/005921
§ 371 (c)(1),
(2), (4) Date: Nov. 6, 2009

(87) PCT Pub. No.: WO2008/003477
PCT Pub. Date: Jan. 10, 2008

(65) Prior Publication Data
US 2010/0062509 A1    Mar. 11, 2010

(30) Foreign Application Priority Data
Jul. 4, 2006  (DE) .................. 10 2006 030 835

(51) Int. Cl.
*B01D 35/06* (2006.01)
*B03C 1/00* (2006.01)

(52) U.S. Cl. ........ 210/695; 210/222; 210/223; 210/491; 210/494.2; 210/502.1; 210/506

(58) Field of Classification Search .................. 210/695, 210/222, 223, 491, 494.2, 502.1, 506
See application file for complete search history.

(56) References Cited

U.S. PATENT DOCUMENTS

| | | | |
|---|---|---|---|
| 4,214,986 A | 7/1980 | Watson et al. | |
| 4,855,045 A * | 8/1989 | Reed | 210/223 |
| 5,084,169 A | 1/1992 | Noble et al. | |
| 5,547,585 A | 8/1996 | Shepherd et al. | |

FOREIGN PATENT DOCUMENTS

EP    0010969 A1    5/1980

OTHER PUBLICATIONS

Qiu, W., et al., "Study on a novel POM-based magnetic photocatalyst: Photocatalytic degradation and magnetic separation", Chemical Engineering Journal, Jan. 23, 2007, 125(3):165-176.

* cited by examiner

*Primary Examiner* — David A Reifsnyder
(74) *Attorney, Agent, or Firm* — McDonnell Boehnen Hulbert & Berghoff LLP

(57) ABSTRACT

The present invention relates to a fixed bed, for example for the isolation and/or purification of components originating from a biological system, which fixed bed comprises magnetic beads and a magnetizable fabric arranged at least in part in the fixed bed, a fluidized bed-fixed bed, which comprises the fixed bed of the invention after application of an alternating magnetic field, and also to a process for the isolation and/or purification of components originating from a biological system.

8 Claims, 1 Drawing Sheet

S: column housing
P: magnetic beads
G: magnetizable mesh
F: feed
N: power supply part
M: magnetic coils for magnetizing the mesh

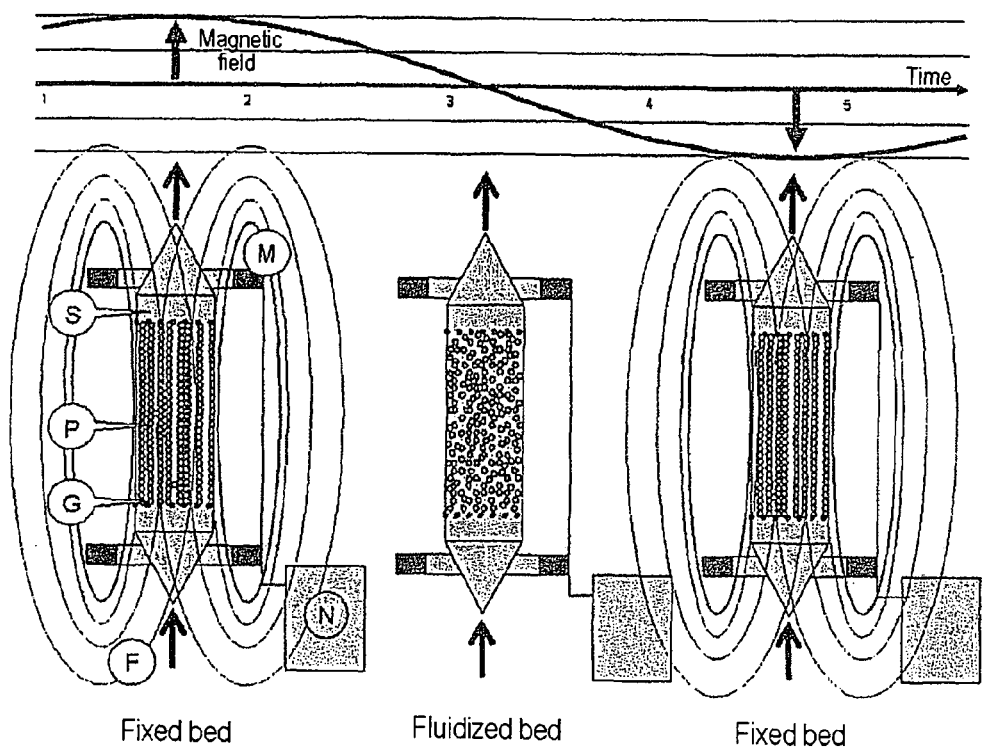
- S: column housing
- P: magnetic beads
- G: magnetizable mesh
- F: feed
- N: power supply part
- M: magnetic coils for magnetizing the mesh

HIGHLY POROUS MAGNETIC TEMPORARY FIXED BED

CROSS-REFERENCE TO RELATED APPLICATONS

This application is a section 371 of International application No. PCT/EP2007/005921, filed Jul. 4, 2007, which in turn claims priority fromk DE 10 2006 030 835.2, filed Jul. 4, 2007.

The present invention relates to a fixed bed, for example for the isolation and/or purification of components originating from a biological system, which fixed bed comprises magnetic beads and a magnetizable fabric arranged at least in part in the fixed bed, a fluidized bed-fixed bed (also "temporary fixed bed/fluidized bed"), which comprises the fixed bed of the invention after application of an alternating magnetic field, and also to a process for the isolation and/or purification of components originating from a biological system.

An essential aspect of pharmaceutical biotechnology is the isolation or purification of components, for example proteins, originating from biological systems. This isolation or purification customarily proceeds via chromatographic or fixed-bed adsorption processes in which the components to be isolated or purified are bound to beads functionalized in a suitable manner. The sorption rate and thus the efficiency of the process depends, inter alia, on the bead size used and also on the flow velocity of the mobile phase through the fixed bed.

Although the beads customarily used in the fixed-bed adsorption process, at 35 to 50 µm, have a suitable size for rapid adsorption of the components originating from biological systems, the capacity of such systems is greatly restricted, however, owing to the comparatively low flow velocities of the mobile phase through the fixed bed. In addition, fixed-bed adsorption processes require a usually complex pretreatment (filtration, centrifugation or sedimentation) of the suspension containing the product in order to obtain a solids-free solution, since otherwise the fixed bed becomes blocked.

The complex pretreatment of the suspension containing the product can, however, be avoided by the use of fluidized-bed-based adsorbers (expanded bed adsorption, EBA), since fluidized beds, in contrast to fixed beds, cannot be blocked by solid particles, such as cell fragments, for example, present in the suspension. However, the development/generation of fluidized beds is only possible using comparatively large beads in the range from 150 to 250 µm. Owing to the low sorption rates of biomolecules such as proteins, for example, therefore only superficial loading of the beads proceeds, which leads to a low efficiency of this process. A further disadvantage of fluidized beds is the axial mixing of the fluid and of the beads. In addition, inhomogeneous particle-free regions can lead to impairments in conversion rate.

By using magnetic beads in magnetically stabilized fluidized beds (MSFBs), the fluidized-bed processes can be significantly improved. Magnetic beads are microparticles which have a magnetic core and a functionalized surface.

In the MSFB, magnetic beads are fluidized in a column by an upwardly directed liquid stream. In this case the magnetic beads are held stationary within the fluidized bed in magnetic bead chains by a magnetic field. With strong magnetic forces, a magnetic fixed bed forms. As a result of the magnetic stabilization, it is possible to essentially suppress the axial mixing caused by the bead movement. As a result, higher flow velocities compared with customary fluidized beds are possible, which leads to higher efficiency of the system.

By means of the MSFB, low axial mixing, low pressure drop, good mass transfer behaviour, high throughputs and continuous operation may be achieved. However, in the MSFB there is a tendency towards channel formation, as a result of which the efficiency of the system is decreased. In addition, owing to the fixed-bed-like character at high magnetic field strengths, the problem of blocking of the beads by solids present in the mobile phase can also occur.

In addition to the MSFB, fluidized beds of magnetic beads in an alternating magnetic field are also known (magnetically stirred reactor, MSR). In this case, a strong vortexing of the magnetic beads is achieved by means of the alternating magnetic field. This results in a fluidized bed which can be maintained even without a fluid stream.

Therefore, the object of the present invention is to provide a novel system for the isolation and/or purification of components originating from a biological system using magnetic beads (also "magnetic particles"), which system combines the advantages of a fluidized bed system with those of a fixed bed system, and which in particular makes possible low axial mixing, low pressure drop, good mass-transfer behaviour, high throughputs and continuous operation without a pretreatment of the biological system by filtration or the like.

This object is achieved by the embodiments characterized in the claims.

In particular, a fixed bed, for example for the isolation and/or purification of components originating from a biological system is provided, comprising magnetic beads having a particle size in the range from about 10 to about 100 µm which is capable of the binding or adsorption of components originating for example from a biological system and a magnetizable fabric arranged at least in part in the fixed bed having a mesh width which corresponds to the particle size range of the magnetic beads respectively present in the fixed bed.

In this case the system can be a suitable biological system. For example, the biological system is a digest (also "lysate") originating from prokaryotic or eukaryotic cells, a cell culture supernatant, a cell culture, a biological liquid or suspension, or a protein mixture or nucleic acid mixture.

The components originating from the biological system which are intended to be isolated and/or purified can be all components which are of interest biotechnologically and can bind magnetic beads modified in a suitable manner. For example, the components are biomolecules such as enzymes, proteins, (poly)peptides, lipids, sugar-containing compounds or nucleic acids. These biomolecules can also have a labelling which, inter alia, indicates higher selectivity and/or affinity to the magnetic beads having a corresponding surface modification. Examples of these are what are termed fusion proteins having "His tags".

As magnetic beads, use can be made of magnetic beads known in the prior art which are capable of the binding of the components originating from the biological system. For this the magnetic beads are surface-treated in a suitable manner, that is to say the surface of the magnetic beads is provided with groups having an affinity for the components to be isolated or purified. Such groups are known in the prior art. In addition, it is known in the prior art in what manner magnetic beads must be surface-treated in order to bind selectively a certain component from a biological system.

The magnetic beads used in the context of the present invention have a particle size in the range from about 10 to about 100 µm, preferably in the range from about 10 to about 50 µm. This particle size enables the binding or adsorption of the components originating from the biological system to be achieved at a high rate, which significantly improves the effectiveness of the isolation or purification system.

The magnetizable fabric serves for magnetic fixing of the magnetic beads. Preferably, the magnetizable fabric is a metallic (also "metal-containing") wire fabric. The magnetizable fabric can pass through the fixed bed and/or be arranged as outer limit of the fixed bed. In order that the magnetizable fabric effectively fixes the magnetic particles, it is advantageous that the mesh width of the fabric substantially corresponds to the particle size of the magnetic beads. The magnetizable fabric can be arranged in this case at any desired angle to the direction of flow, preferably perpendicularly.

The fixed bed of the invention is preferably arranged in a suitable container or housing. Such housings are known in the prior art and are preferably available in the form of a column. The housing consists, for example, of a suitable material such as glass or plastic.

Application of an alternating magnetic field having a frequency in the range from about 0.01 to about 20 Hz, preferably at a frequency in the range from about 0.05 to about 10 Hz, produces a fluidized bed-fixed bed from the fixed bed of the invention. In the context of the present invention, a fluidized bed-fixed bed (also "temporary fixed bed/fluidized bed") is taken to mean a system in which the beneficial properties of a fluidized bed are combined with those of a fixed bed in a synergistic manner.

As a result of the alternating magnetic field, the magnetic beads are regularly rearranged, as a result of which a regular restructuring of the bed is achieved. This leads to a bed having fluidized bed character, which has a high porosity and a low pressure drop, in which blocking by solids such as cell fragments, for example, can be avoided and which permits high flow velocities.

Secondly, as a result of the magnetic fixing of the magnetic beads, according to the invention use can be made of beads having a size from about 10 to about 100 µm in the bed. As a result, the bed according to the invention likewise has fixed bed character which enables a high loading of the magnetic beads and also the realization of a plurality of separation stages (also "theoretical plates"). In addition, as a result of the magnetic fixing, countercurrent flow conditions are significantly simpler to implement than in a fluidized bed or in a fixed bed.

Using the fluidized bed-fixed bed according to the invention it is possible to combine the advantages of a fluidized bed with the reaction-kinetics advantages of small beads having a size of about 10 to about 100 µm. In particular, this combination, in addition to a high convective mass transport, simultaneously makes possible a high reaction rate owing to the favourable surface/volume ratio of the magnetic beads. In addition, as a result of the magnetic fixing of the beads, the usable flow velocity increases to a multiple of the discharge velocity in a conventional fluidized bed. As a result of the arrangement of the beads along the magnetic field lines, in addition good flowability through the bed is achieved. This effect is further increased by the magnetizable fabric in the bed.

In addition, the present invention relates to a process, for example for the isolation and/or purification of components originating from a biological system, which uses the above-defined fluidized bed-fixed bed for the adsorption or binding of the components originating from a biological system to the magnetic beads.

In this case preferably a mixture which contains the components originating from a biological system is fed to the fluidized bed-fixed bed according to the invention. After the binding or adsorption of the components originating from a biological system to the magnetic beads in the fluidized bed-fixed bed according to the invention, the magnetic beads together with the components bound or adsorbed thereto can be separated off. In the case of continuous operation in countercurrent flow, suitable processes are known in the prior art for separating off the magnetic beads from the fluidized bed-fixed bed and use, for example, the magnetic character of the beads. After separating off the magnetic beads from the fluidized bed-fixed bed, the components bound to the magnetic beads can be eluted by suitable processes. Elution can also proceed within the fluidized bed-fixed bed. As a result, the corresponding components are obtained in isolated or purified form. The mixture which contains the components originating from a biological system is preferably fed via a countercurrent flow procedure. In this manner, more efficient isolation or purification can proceed.

FIG. 1 shows a diagrammatic presentation of the fluidized bed-fixed bed according to the invention.

The present invention will be described in more detail hereinafter with reference to an example, without, however, being restricted by this.

EXAMPLE

Experimental Set-up

The experimental plant essentially consisted of the reactor, the magnetic coil system and also a measurement data detection system not discussed further here.

FIG. 1 shows a diagrammatic sketch of the structure.
Column:

The reactor consisted of a Plexiglas column (internal diameter 18 mm, length 107 mm). The connection of both feed ports was effected via screw threads and was simultaneously used for fixing the magnetizable wire fabric having a nominal mesh width of 100 µm. The temperature of the solutions corresponded to the ambient temperature. In the reactor outlet, the flow rate was set via a rotameter. The flow rate was checked over an adequate period using a standard cylinder.
Coil Systems for Generating the Magnetic Field:

The column was placed between a coaxially arranged cylindrical coil system of two or four coils (M). To generate a homogeneous magnetic field, the coils were mounted apart by the distance of their radius (simplified HELMHOLTZ arrangement). To generate the alternating magnetic field, an amplifier was coupled to an analogue frequency generator. In this case the flux density could be varied between 0 and 7 mT and the frequency between 0 and 1000 Hz.
Magnetic Beads:

The magnetic beads used consisted of a polyvinyl alcohol-acrylic acid matrix having enclosed maghemite particles (gamma-$Fe_2O_3$). The remanence was 21 $A \cdot m^2/kg$. The bead diameter was about 125 µm and the density 1.23 g/ml. The surface of the beads was functionalized by imidodiacetic acid (IDA).

Using the above-described device, "HIS-tagged" eGFP was purified or isolated from an *E. coli* cell digest.

The invention claimed is:

1. A temporary fixed bed/fluidized bed comprising magnetic beads having a particle size in the range from 10 to 100 µm, and a magnetizable fabric arranged at least in part in the temporary fixed bed/fluidized bed having a mesh width which corresponds to the particle size range of the magnetic beads respectively present in the fixed bed, wherein the fixed bed/fluidized bed is subjected to an alternating magnetic field having a frequency in the range from 0.01 to 20 Hz.

2. The temporary fixed bed/fluidized bed according to claim 1, wherein the magnetic beads have a particle size in the range from 10 to 50 µm.

3. The temporary fixed bed/fluidized bed according to claim 1, wherein the magnetic beads are capable of the adsorption of components originating from a biological system.

4. The temporary fixed bed/fluidized bed according to claim 3, wherein the components originating from the biological system are biomolecules comprising enzymes, proteins, (poly)peptides, lipids, sugar-containing compounds or nucleic acids.

5. The temporary fixed bed/fluidized bed according to claim 3, wherein the biological system is a digest originating from prokaryotic or eukaryotic cells, a cell culture supernatant, a cell culture, a biological liquid or suspension, or a protein mixture or nucleic acid mixture.

6. The temporary fixed bed/fluidized bed according to claim 1, wherein the magnetizable fabric is a metal-containing wire fabric.

7. The temporary fixed bed/fluidized bed according to claim 1, wherein the alternating magnetic field has a frequency in the range from 0.05 to 10 Hz.

8. Process for the isolation and/or purification of components originating from a biological system, the process comprising the step of adsorption of the components originating from a biological system to the magnetic beads in the temporary fixed bed/fluidized bed according to claim 1.

* * * * *